United States Patent [19]

Shimazaki

[11] Patent Number: 5,164,853
[45] Date of Patent: Nov. 17, 1992

[54] LIQUID CRYSTAL DISPLAY PANEL WITH PLURAL SUBSTRATES

[75] Inventor: Yutaka Shimazaki, Kawasaki, Japan
[73] Assignee: Ricoh Company, Ltd., Tokyo, Japan
[21] Appl. No.: 779,169
[22] Filed: Oct. 21, 1991

Related U.S. Application Data

[63] Continuation of Ser. No. 500,998, Mar. 29, 1990, abandoned.

[30] Foreign Application Priority Data

Apr. 6, 1989 [JP] Japan .................... 1-87311
Jul. 12, 1989 [JP] Japan .................... 1-179632

[51] Int. Cl.$^5$ .................... G02F 1/1333; G02F 1/1343
[52] U.S. Cl. .................... 359/82; 359/83; 359/88
[58] Field of Search .................... 359/82, 83, 88

[56] References Cited

U.S. PATENT DOCUMENTS

| | | | |
|---|---|---|---|
| 4,408,836 | 10/1983 | Kikuno | 350/334 |
| 4,474,432 | 10/1984 | Takamatsu et al. | 350/336 X |
| 4,832,457 | 5/1989 | Saitoh et al. | 350/334 |
| 4,896,946 | 11/1990 | Suzuki et al. | 350/336 |
| 4,906,071 | 3/1990 | Takahara et al. | 350/331 R |
| 4,964,700 | 10/1990 | Takabayashi et al. | 350/336 |

FOREIGN PATENT DOCUMENTS

| | | |
|---|---|---|
| 59-22089 | 2/1984 | Japan . |
| 61-236582 | 10/1986 | Japan . |
| 61-236585 | 10/1986 | Japan . |
| 62-111235 | 5/1987 | Japan . |
| 62-111240 | 5/1987 | Japan . |

*Primary Examiner*—Janice A. Howell
*Assistant Examiner*—Ron Trice
*Attorney, Agent, or Firm*—Oblon, Spivak, McClelland, Maier & Neustadt

[57] ABSTRACT

A liquid crystal display panel is composed of a plurality of panel elements. The panel elements are arranged in matrix form in a plane. Each element comprises an upper flexible substrate having a plurality of electric terminals formed thereon and a lower flexible substrate having a plurality of electric terminals formed thereon. Two adjacent panel elements are arranged in such a manner that the terminals of the upper substrate are electrically connected to the terminals of the lower substrate through a conductive resin layer disposed therebetween.

5 Claims, 7 Drawing Sheets

LIQUID CRYSTAL DISPLAY PANEL WITH PLURAL SUBSTRATES

This application is a continuation of application Ser. No. 07/500,998, filed on Mar. 29, 1990, now abandoned.

BACKGROUND OF THE INVENTION

1. Field of the Invention

The present invention relates to a liquid crystal display panel, especially to a large sized liquid crystal multi-display-panel which comprises a plurality of liquid crystal panel elements which are interconnected together.

Also, the present invention relates to a liquid crystal display panel element comprising a flexible substrate made from a polymer film or the like.

2. Description of the Related Art

Nowadays, a trend of the liquid crystal display technology is to large sized display panels. However, it is difficult to fabricate a large panel from a single panel from the stand point of manufacturing technique. Therefore, it is desirable to construct such a large display panel in the form of a liquid crystal multi-display-panel made from a plurality of panel elements disposed in a matrix in a plane.

In such a multi-display-panel, it is important to reliably interconnect the panel elements electrically with each other.

A method for electrically connecting the panel elements together is disclosed and proposed in Japanese Patent Application Laying Open (KOKAI) Nos. 61-236582 and 61-236585. The proposed method is such that connecting portions are formed on an end surface of a glass substrate at the same pitch as that of electrode terminals for outer connection. Further, the connecting portions of the substrate are attached to portions similarly formed on an adjacent substrate by means of solder bonding or conductive adhesive agent.

However, the proposed method is complicated, which increases the production costs thereof. Also, it is necessary to process the substrate end surface in accordance with the number of electrode terminals for outer connection which tends to increase these days and the pitch of the terminals which has become more and more small.

Also, the application of the proposed method is limited to a relatively thick substrate considering the reliability of the connection and the structure of the connecting portions formed on the end surface of the substrate. Therefore, the method is not applicable to a liquid crystal display panel comprising a polymer film substrate.

SUMMARY OF THE INVENTION

It is therefore an object of the present invention to provide a liquid crystal multi-display-panel, considering the above-mentioned deficiencies of the related art, which enables the use a polymer film as the substrate thereof and has high reliability of connection as well as reduced costs of production.

The above-mentioned object of the present invention can be achieved by a liquid crystal display panel comprising a plurality of panel elements made from a polymer film which are disposed in matrix form in one plane, every adjacent two elements being interconnected together in such a way that an upper substrate of one of the elements is connected with a lower substrate of the other element so that terminals for outer connection of the upper and lower substrates are heated and pressed to each other to bond together through a resin layer including electric conductive particles.

Advantages of the above-mentioned liquid crystal display panel of the present invention are that the adjacent two panel elements are easily and reliably connected together and that the production costs thereof are lowered.

Further objects and advantages of the present invention will be apparent from the following description of the preferred embodiments of the invention as illustrated in the accompanying drawings.

BRIEF DESCRIPTION OF THE DRAWINGS

FIG. 2b is a sectional view of the panel element of FIG. 2a;

FIG. 3b is a sectional view along the line A—A in FIG. 3a;

FIG. 3c is a sectional view along the line B—B in FIG. 3a;

FIG. 4b is a sectional view along the line C—C in FIG. 4a;

FIG. 4c is a sectional view along the line D—D in FIG. 4a;

FIG. 5b is a sectional view along the line E—E of FIG. 5a;

FIG. 5c is a sectional view along the line F—F of FIG. 5a;

FIG. 6b is a sectional view of the multi-display-panel of FIG. 6a;

DESCRIPTION OF THE PREFERRED EMBODIMENTS

Embodiments of the present invention are described hereinafter in comparison to the related art with reference to the drawings.

Figure 6A:
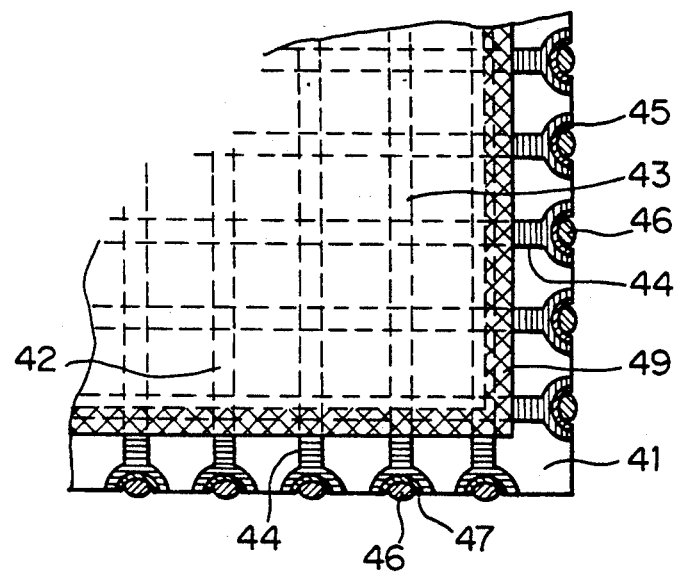
FIG. 6a is a partial plan view of a liquid crystal multi-display-panel in accordance with the related art for explaining the connection structure between the panel elements thereof.
Figure 6B:
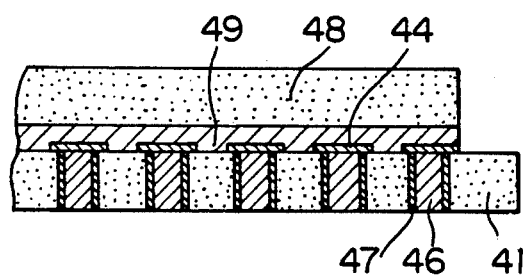

FIGS. 6a and 6b represent an example of the method for connecting the display panel elements with each other in accordance with a related art. FIG. 6a is a partial plan view of the display panel element and FIG. 6b is a sectional view thereof.

The panel element of this example comprises a glass substrate 41, segment electrodes (or common electrodes) 42, common electrodes (or segment electrodes) 43, terminals 44 for outer connection, recesses 45, electrode bonding materials 46, conductive coating layers 47, a cover glass 48 for sealing the electrode structure, and a sealing member 49. Each of the recesses 45 has a semi-cylindrical shape. The recesses 45 are formed on the edge surface of the glass substrate 41 at the same pitch as that of the terminals 44. The conductive coating layer 47 is formed on an inner surface of each recess 45 by an vacuum evaporation method or plating. The layer 47 is connected to the corresponding terminal 44. A bonding material such as solder or conductive resin (not shown) is filled in the recess 45 so that the panel is bonded to the adjacent panel by heating the material or hardening the resin.

In accordance with the liquid crystal multi-display-panel having the connecting structure mentioned above, it becomes unnecessary to individually transmit an electric signal to every panel element to display information on the entire panel and possible to drive the entire panel only by connecting a drive circuit to the terminals 44 formed on the panel element disposed at the end of the multi-display-panel. Also, the edge surface portion of each substrate is used for connecting the adjacent substrate thereto, which makes it possible to minimize the space between the adjacent panel elements.

However, in accordance with the multipanel structure mentioned above, the process for fabricating the panel becomes complicated due to the fact that the semi-cylindrical recesses 45 have to be formed on the side edge of the substrate of each element and because the coating layer 47 has to be formed in each recess 45 to electrically connect the inner surface thereof to the terminal 44.

The problem mentioned above is obviated by an embodiment of the invention which is described hereinafter.

Figure 1:
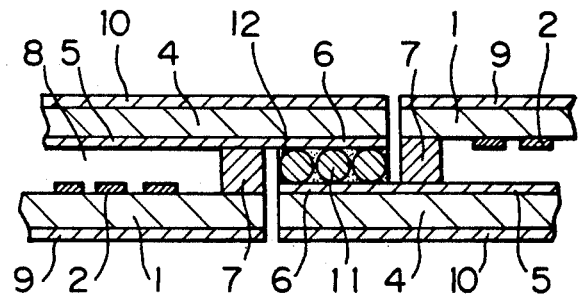
FIG. 1 is a sectional view of a part of an embodiment of the liquid crystal multi-display-panel in accordance with the present invention.
Figure 2A:
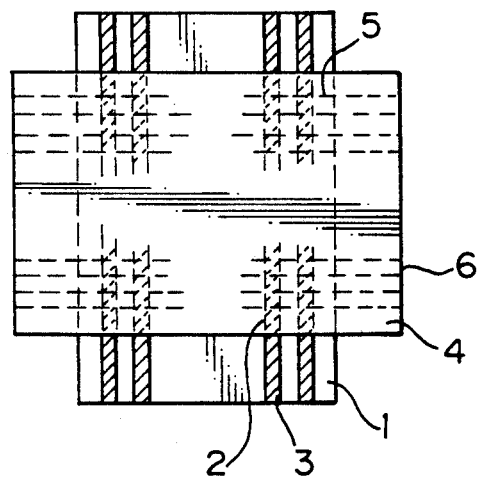
FIG. 2a is a plan view of a panel element of the multi-display-panel of FIG. 1.
Figure 2B:
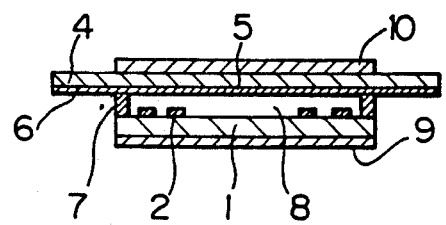

FIG. 1 is a partial sectional view of an embodiment of the liquid crystal multi-display-panel in accordance with the present invention. FIGS. 2a and 2b are a plan view and a sectional view of a display panel element of the multi-display-panel.

The multi-display-panel comprise a plurality of panel elements. Each of the panel elements comprises a segment substrate 1 and a common substrate 4. The substrate 1 has a plurality of segment electrodes 2 formed thereon in parallel rows. Each electrode 2 has an electrode terminal 3 for outer connection to be electrically connected from outside at an end thereof. Also, the substrate 4 has a plurality of common electrodes 5 formed thereon in parallel rows. Each electrode 5 has an electrode terminal 6 for outer connection to be electrically connected from outside.

The substrates 1 and 4 are juxtaposed to each other in such a way that the electrodes 2 and 5 are disposed inside of the substrates so as to face to each other and perpendicular to each other. A sealing member 7 is disposed along the periphery of the substrates and between the substrates 1 and 4 so as to form a closed cell between the substrates 1 and 4 in which cell a liquid crystal 8 is filled. The upper and lower surfaces of the cell are covered by polarizing plates 9 and 10, respectively. Each substrate 1, 4 has a rectangular shape and is arranged in such a way that both ends thereof are not superposed on the other substrate, as illustrated in FIG. 2a. The terminals 3 and 6 are formed on these end portions of the substrates 1 and 4.

The panel elements, each having the structure mentioned above, are connected to each other as described below.

One of the adjacent elements is disposed upside down as illustrated in FIG. 1. A resin layer 12 which contains conductive particles 11 is formed on the terminal 6 of one of the adjacent elements. The layer 12 is superposed on the terminal 6 of the other element so that the layer 12 is sandwiched between the terminals 6 of the upper and lower substrates 4. The layer 12 and the terminals 6 are aligned with each other. After that, the sandwiched portion is heated and pressed so that the terminals 6 and 6 of the adjacent two panel elements are bonded and electrically connected to each other through the layer 12. The layer 12 which contains the particles 11 is made from, for example, a thermosetting anisotropic conductive film.

Figure 3A:
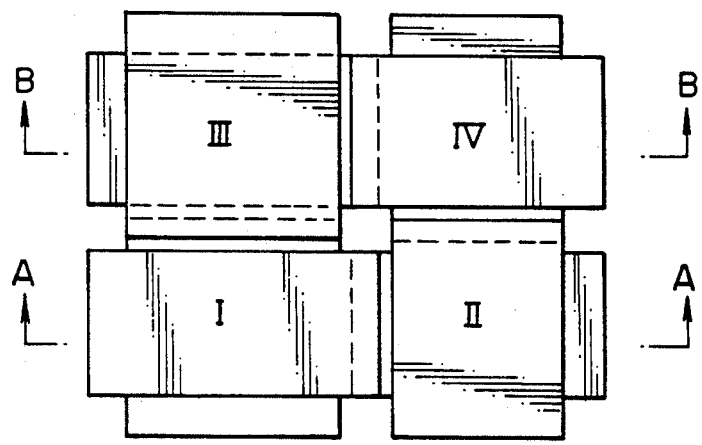
FIG. 3a is a plan view of a whole structure of the embodiment of the present invention of FIG. 1.
Figure 3B:
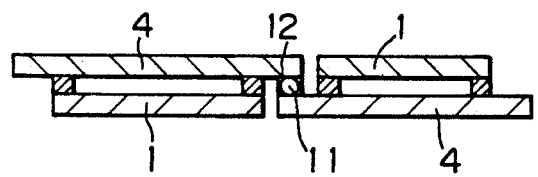
Figure 3C:
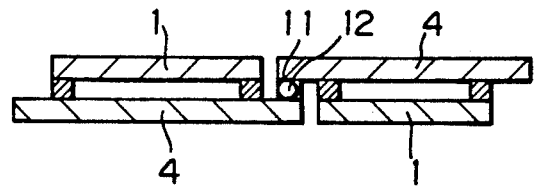

FIG. 3a illustrates an upper view of a multi-display-panel comprising four panel elements I, II, III and IV which are disposed in matrix and interconnected together in a manner as mentioned above. FIGS. 3b and 3c illustrate sections of the panel of FIG. 3a along the lines A—A and B—B, respectively.

In accordance with the above-mentioned embodiment of the present invention, the liquid crystal multi-display-panel is constituted in such a manner that a plurality of panel elements, each comprising a polymer film substrate, are disposed in a matrix in a plane, that outer electrode terminals of the adjacent elements are overlapped each other through the conductive resin layer, and that the overlapped portion is bonded together by heating and pressing the resin layer. Therefore, the reliability of electrically connecting the panel elements is increased even when electrodes are very thin and the multi-display-panels are manufactured at a low cost.

Figure 4A:
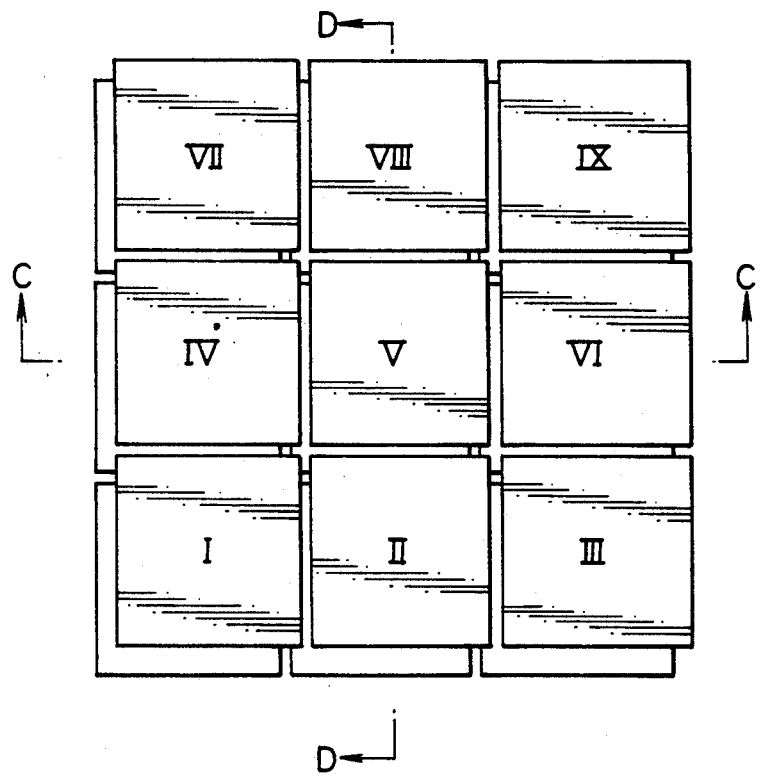
FIG. 4a is a plan view of a whole structure of another embodiment of the present invention.
Figure 4B:
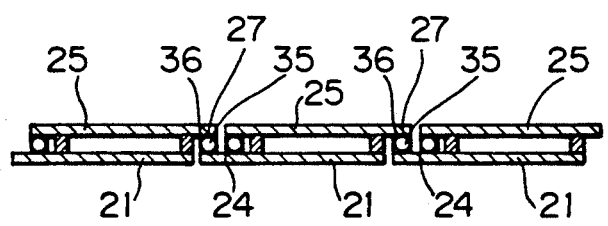
Figure 4C:
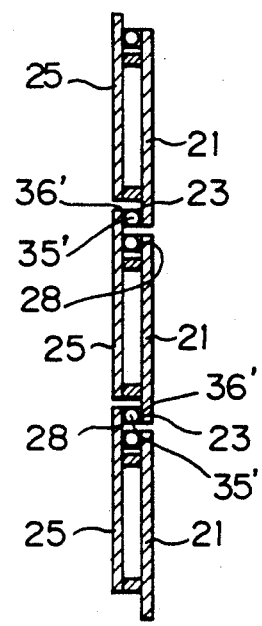
Figure 5A:
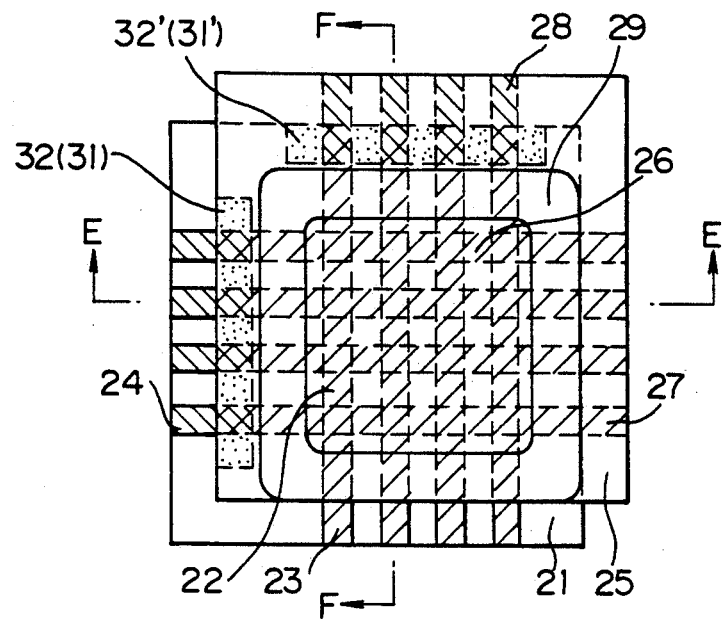
FIG. 5a is a plan view of a panel element of the multi-display-panel of FIGS. 4.
Figure 5B:
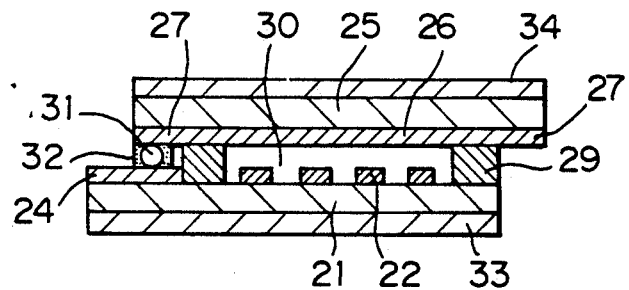
Figure 5C:
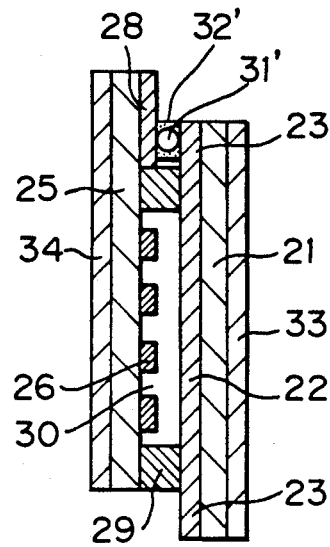

Another embodiment of the liquid crystal multi-display-panel in accordance with the present invention is described hereinafter with reference to FIGS. 4 and 5. FIG. 4a is a plan view of the multi-display-panel of the invention. FIGS. 4b and 4c are sectional views along the lines C—C and D—D of FIG. 4a, respectively. FIG. 5a is a plan view of a panel element of the panel of FIG. 4a. FIGS. 5b and 5c are sectional views along the lines E—E and F—F of FIG. 5a, respectively.

The panel element comprises a lower substrate 21 and an upper substrate 25. The substrate 21 has a plurality of common electrodes 22 disposed thereon in parallel to each other and outer segment terminals 24 which are perpendicular to and separated from the electrodes 22. Each end of the electrodes 22 define an outer common terminal 23. The upper substrate 25 similarly has a plurality of segment electrodes 26 disposed thereon in parallel to each other and outer common terminals 28 which are perpendicular to and separated from the electrodes 26. Each end of the electrodes 26 define an outer segment terminal 27.

The upper and lower substrates 21 and 25 are juxtaposed to each other and dislocated from each other in both the lateral and vertical directions, as illustrated in FIG. 5a, in such a way that the electrodes 22 and 26 are disposed perpendicular to each other inside the substrates 21 and 25 to face each other. Further, a sealing member 29 is printed along the periphery of the substrates 21 and 25 and between the substrates so as to form a closed cell between the substrates 21 and 25. The cell is filled with a liquid crystal material 30.

The terminals 24 and 28 are formed on the upper and lower substrate 21 and 25 outside the sealing member 29, i.e., outside the cell, respectively.

A conductive resin layer 32 which contains electric conductive particles 31 is formed on a part of the terminals 24 of the lower substrate 21. The layer 32 is bonded to and electrically connected to the terminals 27 of the upper substrate 25, as illustrated in FIG. 5b.

Also, a conductive resin layer 32' which contains electric conductive particles 31' is formed on a part of the terminals 28 of the upper substrate 25. The layer 32' is bonded to and electrically connected to the terminals 23 of the lower substrate 21, as illustrated in FIG. 5c.

A thermosetting anisotropic conductive film may be used as the layer 32, 32'.

The layers 32 and 32' are temporarily secured to the substrates 21 and 25, respectively. After that, the substrates 21 and 25 are combined and bonded together through the member 29. After the member 29 is hardened, the layers 32 and 32' are heated and pressed together to connect the upper and lower terminals 27, 28, and 23, 24.

After that, an upper polarizing plate 34 and a lower polarizing plate 33 are arranged on both surfaces of the cell as manner mentioned above so that a liquid crystal display panel element is fabricated.

Note that an orientating material is coated on each of the substrates 21 and 25. Also, gapping members (not shown) are distributed between the upper and lower substrates 21 and 25.

A plurality of panel elements each having the structure mentioned above are combined and connected together as described below to form a multi-display-panel.

FIGS. 4a to 4c illustrate a multi-display-panel which is composed of nine panel elements I to IX each of which is constituted as illustrated in FIGS. 5a to 5c.

As illustrated in FIGS. 4, resin layers 36, 36' which contain conductive particles 35 are formed on the terminals 24 and 28 of the substrates 21 and 25, respectively. In the lateral direction of the panel, for example, the elements I and II are coupled together in such a way that the terminal 27 of the upper substrate 25 is connected to the terminal 24 of the lower substrate 21 through the conductive layer 36. Also, in the vertical direction of the panel, for example, the elements I and IV are coupled together in such a way that the terminal 28 of the upper substrate 25 is connected to the terminal 23 of the lower substrate 21 through the conductive layer 36'.

A thermosetting anisotropic conductive film may be used as the layer 36, 36'.

By heating and pressing the layer of the film, the adjacent two panel elements are bonded together and electrically connected with each other.

In accordance with the embodiment mentioned above, the following advantage can be obtained in addition to the advantages of the embodiment of FIG. 1.

In the structure of the embodiment of FIG. 1, one of the adjacent two panel elements is arranged upside down. Such a structure can not be applied as it is to a display panel having an RGB color filter formed on the substrate thereof, since the display seen from the front side of the panel is different from that seen from the rear side of the panel due to the function of the filter. Therefore, when the structure of FIG. 1 is to be applied to the panel provided with the RGB filter, two different type panel elements have to be prepared and arranged alternately to form the display panel.

On the other hand, the structure of FIGS. 4 can be applied to the display panel having the RGB filter as it is, since all of the panel elements of the structure are arranged in the same dirrection without one of the adjacent elements being arranged upside down, which is advantageous in the aspect of the fabricating cost thereof.

As mentioned above, in accordance with the embodiments of the present invention, two adjacent panel elements are coupled together in such a way that the outer connection terminal of the upper substrate of one of the elements is electrically connected to that of the lower substrate of the other element through the conductive resin layer by heating and pressing the layer to bond the terminals together. Therefore, it becomes possible to realize a liquid crystal multi-display-panel which has a high connection reliability and can be produced at a low cost using polymer film substrates.

A liquid crystal display panel element relating to the invention comprises, as mentioned above, a pair of upper and lower substrates (a segment substrate and a common substrate) between which a cell is formed in which cell a liquid crystal material is sealingly charged. Transparent electrodes (segment electrodes and common electrodes) are formed on the surfaces of the substrates facing to each other. Also, electrode terminals are formed on the substrate surfaces so that each of the transparent electrodes of the substrates is connected to a corresponding output electrode of the drive circuit. The substrate may comprise a rigid material such as glass or a flexible material such as polymer film which is advantageous from the stand points of weight, thickness and shock proof.

Figure 8:
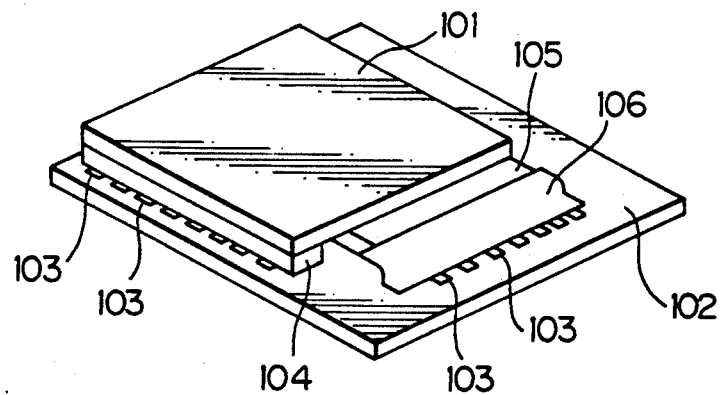
FIG. 8 is a perspective view of an example of the liquid crystal panel element in accordance with the related art.

FIG. 8 illustrates an example of the connection structure which connects the terminals of the substrate and that of the outside drive circuit.

In FIG. 8, a segment substrate 101 has segment electrodes (not shown) and segment terminals (not shown) formed thereon. The segment terminals are connected to output electrode terminals 103 of a circuit board 102 through a zebra connector 104 or an anisotropic conductive film. Also, a common substrate 105 has common electrodes (not shown) and common electrode terminals (not shown) formed thereon. The common terminals are connected to the output terminals 103 of the circuit board 102 through a film connector 106.

Figure 9:
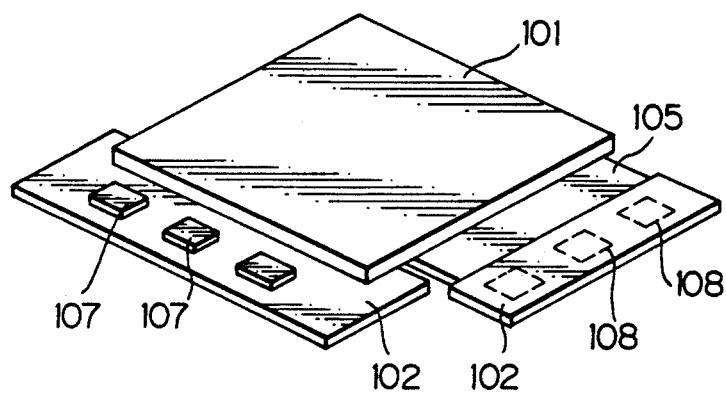
FIG. 9 is a perspective view of another example of the liquid crystal panel element in accordance with the related art.

FIG. 9 illustrates another example of the connection structure which connects the terminals of the substrate and that of the outside drive circuit.

In FIG. 9, the segment substrate 101 and the circuit board 102 are connected together through a zebra connector or an anisotropic conductive film. Also, the common substrate 105 and the circuit board 102 are connected together through a zebra connector or an anisotropic conductive film.

In accordance with the structure of FIG. 8, the terminals of the substrate 105 can not be directly connected to the terminals 103 of the board 102.

On the other hand, in accordance with the structure of FIG. 9, it is possible to directly connect the terminals of the substrates 101 and 105 to the output terminals of the board 102 in the same plane. However, the mounting surface of LSIs 107 of the board 102 is opposite to that of LSIs 108 of the other board 102, which increases the thickness of the element by the height of one LSI.

Another example of the display panel element is disclosed in Japanese Patent Application Laying Open (KOKAI) No. 62-135813.

Figure 10:
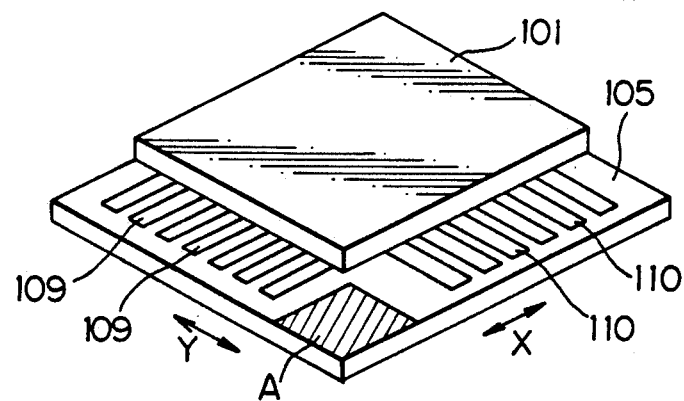
FIG. 10 is a perspective view of still another example of the liquid crystal panel element in accordance with the related art.

Also, FIG. 10 illustrates another example of the display panel element of the related art.

In FIG. 10, a plurality of segment electrode terminals 109 are formed on the common substrate 105. The segment substrate 101 and the common substrate 105 are bonded together in such a way that the terminals 109 of the substrate 105 are connected to segment terminals of the substrate 101 through conductive resin layer (not shown) which contains electric conductive particles. Therefore, the segment electrodes 109 and the common electrodes 110 are formed on the same substrate 105, which makes it possible to directly connect the terminals 109 and 110 to the output terminals of the drive circuit board (not shown) in a same plane.

When the substrates are made from a flexible material such as a polymer film, the substrate terminals and the drive circuit terminals are connected together through a heat seal connector means which is heated and pressed to bond the terminals together.

In structure of FIG. 10, the terminals 109 connected from the segment electrodes and the terminals 110 connected from the common electrodes are formed on the same substrate 105 so that the terminals 109 and 110 are connected to the terminals of the drive circuit board by means of heating and pressing the connecting portion. In this structure, thermal distortion is generated both in the direction of the common electrodes 110 (direction X) and in the direction of the segment electrodes 109 (direction Y). The distortion in the directions X and Y are combined together in the corner area (hatched portion A) so that the substrate surface deforms to a wave shape, which causes malfunctions of the display and separation of substrates 101 and 105 from the sealing portion thereof or separation of the terminals 109 and 110 from the output terminals of the drive circuit board.

To cope with the problem mentioned above, an embodiment of the present invention comprises a flexible segment substrate having segment electrodes formed thereon, a flexible common substrate having common electrodes formed thereon, a liquid crystal material sealingly enclosed between the substrates, segment terminals and common terminals formed on one of the segment substrate and the common substrate, wherein a cut out portion is formed in a substrate corner where the direction of the segment terminal arrangement and the direction of the common terminal arrangement intersect each other.

When the terminals formed on one of the substrates are connected to the terminals of the drive circuit board by heating and pressing the connecting portion, thermal distortion in both directions of segment terminals and common terminals are generated in the substrate. However, due to the cut out portion formed in the corner of the substrate, the combined deformation in both directions is avoided.

Figure 7:
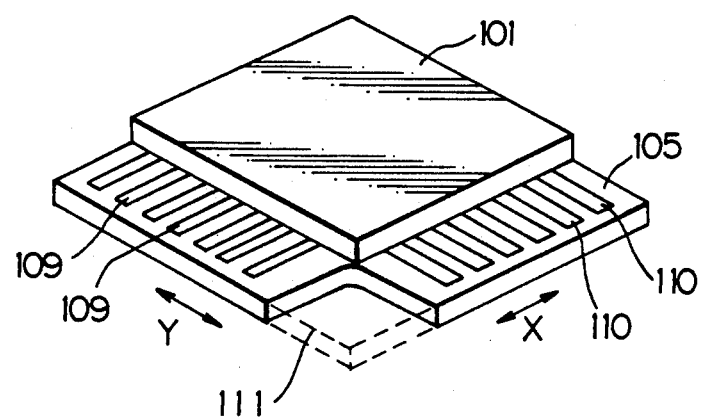
FIG. 7 is a perspective view of still another embodiment of the present invention.

An embodiment of the present invention is described hereinafter with reference to FIG. 7. The same or corresponding parts as the structure of FIG. 10 are designated by the same numerals as FIG. 10.

A segment substrate 101 and a common substrate 105, both substrates being made from a flexible material such as a polymer film, are bonded together in a state wherein a liquid crystal material is sealingly enclosed between the substrates. Transparent segment electrodes (not shown) are formed on the lower surface of the substrate 101 facing to the liquid crystal. Also, transparent common electrodes (not shown) are formed on the upper surface of the substrate 105.

On the upper surface of the substrate 105 are formed the common electrodes and the terminals 110 connected from the common electrodes and segment terminals 109 connected from the segment electrodes.

It is to be noted that the segment electrodes formed on the upper substrate 101 and the terminal 109 formed on the lower substrate 105 are connected together in such a way that an anisotropic conductive film (not shown) is arranged outside the sealing member which defines a cell to enclose the liquid crystal between the substrates 101 and 105 and that the film is heated and pressed to bond the upper electrodes and the lower terminals together through the film.

Also, it is to be noted that the terminals 109 and 110 are formed on the side edge portions perpendicular to each other of the substrate 105, respectively.

A cutout portion 111 is formed at the corner of the substrate 105 where the direction of the arrangement of the terminals 109 (direction Y) and the direction of the arrangement of the terminals 110 (direction X) intersect each other. The cutout 111 may be formed with the use of a Thomson blade after the terminals 109 and 110 are formed on the substrate 105.

After that, the terminals 109 and 110 are directly connected to the electrodes (not shown) of the drive circuit board (not shown) in the same plane by heating and pressing the connecting portion.

In the structure mentioned above, at the time of bonding of the terminals 109 to the terminals of the circuit board, the substrate 105 is distorted in the direction Y due to the thermal distortion effect along this direction. Also, at the time of bonding of the terminals 110 to the terminals of the circuit board, the substrate 105 is distorted in the direction X due to the thermal distortion effect along this direction. However, due to the arrangement of the cutout 111 formed at the corner of the substrate 105 where the two directions X and Y intersect each other, the substrate 105 is prevented from being distorted in a wave shape by the combination of the distortion in both directions X and Y. As a result, it becomes possible to avoid malfunction of the display caused by the distortion of the substrate or separation of the substrates 101 and 105 from the sealing member or separation of the terminals 109 and 110 from the terminals of the circuit board.

It is to be noted that the electrodes terminals 109 and 110 may be formed on the upper substrate 101 instead of the lower substrate 105 as is the case of the above-mentioned embodiment of FIG. 1.

As mentioned above, in accordance with the embodiment of the present invention, due to the arrangement that the segment terminals 109 and the common terminals 110 are formed on the same substrate 101 or 105 and also due to the arrangement of the cutout 111 formed at the corner of the substrate 101 or 105 where the two directions X and Y intersect each other, the substrate is prevented from being distorted in a wave shape by the combination of the thermal distortion in both directions X and Y by being heated and pressed at the time of bonding process. As a result, it becomes possible to avoid malfunction of the display caused by the distortion of the substrate or separation of the substrates 101 and 105 from the sealing member or separation of the terminals 109 and 110 from the terminals of the circuit board.

Many widely different embodiments of the present invention may be constructed without departing from the spirit and scope of the present invention. It should be understood that the present invention is not limited to the specific embodiments described in the specification, except as defined in the appended claims.

What is claimed is:

1. A liquid crystal display panel comprising:
   a plurality of panel elements, including at least first, second and third panel elements, arranged in matrix form in a plane, each of said elements comprising,
   a first rectangular flexible substrate having a first edge and a second edge crossing said first edge,
   a second rectangular flexible substrate having another first edge and another second edge crossing said another first edge, said first and second substrates being identical in shape with each other,
   said second substrate being disposed substantially in parallel with said first substrate and in partially overlapping relation with said first edge of said first substrate perpendicular to said another first edge of said second substrate, said first substrate protruding from said second substrate at both of a first area thereof along said first edge and a second area thereof along said second edge, said second substrate protruding from said first substrate at both of another first area thereof along said another first edge and another second area thereof along said another second edge, said first area and said second area being located on a surface of said first substrate which surface faces said second substrate, said another first area and said another second area being located on a surface of said second substrate which surface faces said first substrate,
   a first set of elongated electrodes formed on said surface of said first substrate outside said first area with each of said electrodes being parallel to said first edge and extending into said second area at one end portion thereof,
   a first set of terminals formed on said surface of said first substrate in said first area and arranged along said first edge of said first substrate, said first set of terminals being isolated from the electrodes on said first substrate,
   a second set of elongated electrodes formed on said surface of said second substrate outside said another first area with each of said electrodes being parallel to said another first edge and extending into said another second area at one end portion thereof,
   a second set of terminals formed on said surface of said second substrate in said another first area and arranged along said another first edge, said second set of terminals being isolated from the electrodes on said second substrate,
   a first anisotropic conductive film interposed between said first substrate and said second substrate for connecting the other end portion of each electrode on said first substrate to each one of said terminals on said second substrate,
   a second anisotropic conductive film interposed between said first substrate and said second substrate for connecting the other end portion of each electrode on said second substrate to each one of said terminals on said first substrate, and
   liquid crystal material sealingly enclosed between said first substrate and said second substrate; and
   said second panel element juxtaposed to said first panel element on the side of said another second edge of said first panel element with said another second area of said first panel element overlapping said first area of said second panel element; and
   said third panel element juxtaposed to said first panel element on the side of said another first edge of said first panel element such that said another first area of said first panel element overlaps said second area of said third panel element;
   a third anisotropic conductive film interposed between said second substrate of said first panel element and said first substrate of said second panel element for electrically connecting each of said first terminals of said second panel element to said one end portion of each electrode on said second substrate of said first panel element; and
   a fourth anisotropic conductive film interposed between said second substrate of said first panel element and said first substrate of said third panel element for electrically connecting each of said second terminals of said first panel element to said one end portion of each electrode on said first substrate of said third panel element.

2. A liquid crystal display panel according to claim 1, wherein each of said first and second substrates is made of a polymer film.

3. A liquid crystal display panel according to claim 1, wherein said first substrate and said second substrate have a square shape respectively.

4. A liquid crystal display panel according to claim 1, wherein said first substrate has corners extending beyond said second substrate and said second substrate has corners extending beyond said first substrate, and at least one of said corners has a cutout portion.

5. A liquid crystal display panel according to claim 1, wherein each of said first to fourth anisotropic conductive films is a thermosetting anisotropic conductive resin containing conductive particles.

* * * * *